United States Patent
Nishi et al.

(10) Patent No.: US 6,697,129 B1
(45) Date of Patent: *Feb. 24, 2004

(54) GUEST-HOST MODE LIQUID CRYSTAL DISPLAY DEVICE OF LATERAL ELECTRIC FIELD DRIVING TYPE

(75) Inventors: Takeshi Nishi, Kanagawa (JP); Rumo Satake, Kanagawa (JP); Yoshiharu Hirakata, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/280,185

(22) Filed: Mar. 29, 1999

Related U.S. Application Data

(63) Continuation of application No. 08/799,985, filed on Feb. 12, 1997, now Pat. No. 6,055,028.

(30) Foreign Application Priority Data

Feb. 14, 1996 (JP) ................................. 8-52405

(51) Int. Cl.$^7$ .................. G02F 1/133; G02F 1/1343; C09K 19/02
(52) U.S. Cl. ..................... 349/33; 349/42; 349/141; 349/179
(58) Field of Search .................. 349/33, 42, 141, 349/179

(56) References Cited

U.S. PATENT DOCUMENTS

| | | | |
|---|---|---|---|
| 3,774,989 A | * | 11/1973 | Takahashi .................. 349/141 |
| 3,833,287 A | * | 9/1974 | Taylor et al. ................ 349/165 |
| 3,975,085 A | * | 8/1976 | Yamada et al. .............. 349/141 |
| 4,181,563 A | * | 1/1980 | Miyaka et al. .............. 349/141 |
| 4,272,162 A | * | 6/1981 | Togashi et al. .............. 349/179 |
| 4,345,249 A | * | 8/1982 | Togashi ..................... 349/141 |
| 4,385,805 A | * | 5/1983 | Channin .................... 349/141 |
| 4,400,059 A | * | 8/1983 | Nagae et al. ................. 349/33 |
| 4,493,531 A | * | 1/1985 | Bohmer et al. .............. 349/143 |
| 4,601,547 A | * | 7/1986 | Shingu ...................... 349/179 |
| 4,856,875 A | * | 8/1989 | Kozaki et al. ............... 349/179 |

(List continued on next page.)

FOREIGN PATENT DOCUMENTS

| | | |
|---|---|---|
| EP | 0 667 555 A1 | 8/1995 |
| JP | 54-043048 | 4/1979 |
| JP | 63-21907 | 5/1988 |
| JP | 05-505247 | 8/1993 |
| JP | 6-244103 | 9/1994 |
| JP | 07-036058 | 2/1995 |
| JP | 07-092504 | 4/1995 |
| JP | 07-128647 | 5/1995 |
| JP | 07-159786 | 6/1995 |
| JP | 07-225388 | 8/1995 |

OTHER PUBLICATIONS

Yoshino, et al., Fundamentals of Liquid Crystals and their Application to Displays, Corona Publishing Co., Ltd., Tokyo, Japan; pp. 143–147, 1994.

T. Ohkoshi, Liquid Crystal Display, Edited by the Institute of Television Engineers of Japan, pp. 84–94.

*Primary Examiner*—Julie Ngo
(74) *Attorney, Agent, or Firm*—Fish & Richardson P.C.

(57) ABSTRACT

A liquid crystal display device comprising a light modulating layer being interposed between a first substrate and a second substrate, a common electrode being formed over the first substrate in parallel with a drain electrode, wherein an electric field is formed between the drain electrode and the common electrode in a parallel direction to the first substrate, wherein said light modulating layer comprising a liquid crystal material, an optically active substance and a dichroic dye is operated in a guest-host mode, wherein said liquid crystal material has a spiral pitch p in a range of $1<p<15$ μm, and wherein a cell thickness d is in a range of $1<d<10$ μm.

30 Claims, 2 Drawing Sheets

U.S. PATENT DOCUMENTS

| | | | |
|---|---|---|---|
| 5,448,385 A | * 9/1995 | Deffontaines et al. | 349/141 |
| 5,576,867 A | 11/1996 | Baur et al. | |
| 5,600,464 A | 2/1997 | Ohe et al. | 349/123 |
| 5,608,232 A | 3/1997 | Yamazaki et al. | 257/66 |
| 5,639,698 A | 6/1997 | Yamazaki et al. | 437/228 |
| 5,712,495 A | * 1/1998 | Suzawa | 257/49 |
| 5,781,261 A | * 7/1998 | Ohta et al. | 349/111 |
| 5,841,498 A | 11/1998 | Baur et al. | 349/141 |
| 5,841,499 A | 11/1998 | Baur et al. | 349/141 |
| 5,892,562 A | * 4/1999 | Yamazaki et al. | 349/141 |
| 5,910,271 A | 6/1999 | Ohe et al. | 252/299 |
| 5,914,761 A | * 6/1999 | Ohe et al. | 349/132 |
| 5,933,205 A | 8/1999 | Yamazaki et al. | 349/43 |
| 5,946,059 A | 8/1999 | Yamazaki et al. | 349/43 |
| 5,953,088 A | * 9/1999 | Hanazawa et al. | 349/110 |
| 6,011,277 A | 1/2000 | Yamazaki | 257/66 |
| 6,013,928 A | 1/2000 | Yamazaki et al. | 257/347 |
| 6,023,075 A | 2/2000 | Yamazaki | 257/72 |
| 6,055,028 A | * 4/2000 | Nishi et al. | 349/33 |

* cited by examiner

GUEST-HOST MODE LIQUID CRYSTAL DISPLAY DEVICE OF LATERAL ELECTRIC FIELD DRIVING TYPE

This is a continuation of U.S. application Ser. No. 08/799,985, filed Feb. 12, 1997 now U.S. Pat. No. 6,055,028.

BACKGROUND OF THE INVENTION

1. Field of the Invention

The present invention relates to a liquid crystal electro-optical device which is superior in both electrical characteristics and contrast and which can provide bright and uniform display over the entire screen.

2. Description of the Related Art

A liquid crystal electro-optical device is constructed such that a liquid crystal material, which is generally an organic material, is interposed between a pair of substrates. Light traveling through the liquid crystal material is modulated by varying the intensity of an electric field developing between electrodes formed on the pair of substrates. Display is a result of this optical modulation.

Therefore, if a particular electrical signal is applied to an electrode, it can be displayed as a visually recognizable state. Further, a desired image can be formed by applying image data to a plurality of electrodes.

The above conventional optical modulation used in liquid crystal electro-optical devices is effected in the following manner. The orientation of liquid crystal molecules is changed to be parallel with or perpendicular to the substrates by changing the intensity of an electric field developing perpendicularly to the substrates.

In this case, in general, light is modulated by utilizing the optical anisotropy, which is one of the features of the liquid crystal material. Therefore, a polarizing plate is disposed in this device to linearly polarize incident light.

However, in the liquid crystal electro-optical device which operates in the above manner, although a normal display state can be obtained when it is viewed from the direction perpendicular to the display screen, it exhibits dark, unclear display when viewed obliquely. In the case of color display, oblique viewing causes display in an unintended color.

This phenomenon is explained as follows from the relationship between output light of the liquid crystal electro-optical device and orientation of liquid crystal molecules.

With a scheme in which liquid crystal molecules are oriented perpendicularly to the substrates, there is obtained for certain display an orientation state that the major-axes of liquid crystal molecules are arranged in the same direction. In this case, output light is observed from a surface perpendicular to the liquid crystal arrangement direction.

In this state, if the device is viewed from a direction somewhat deviated from the perpendicular direction, the line of observation is deviated as much from the direction of the major axes of liquid crystal molecules. This means that the output light greatly depends on the viewing direction. Thus, the viewing angle characteristic with respect to a viewer such that the performance deteriorates as the viewing direction deviates from the perpendicular direction.

To solve the above problem, there has been proposed an operation mode which is different from that in conventional liquid crystal electro-optical devices. In this operation mode, the optical characteristics are changed by rotating liquid crystal molecules only in a plane parallel with the substrates. This operation mode, which will be hereinafter called "IPS mode," is described in detail in Japanese Examined Patent Publication No. Sho. 63-21907.

In the IPS mode, an electric field is formed between a pair of electrodes formed on a single substrate and hence its main component is parallel with the substrate and a liquid crystal layer. The electric field causes liquid crystal molecules to rotate in a plane parallel with the substrate. Therefore, the IPS mode solves the above-mentioned viewing angle problem resulting from the vertical alignment of liquid crystal molecules in a certain aspect of operation.

However, a polarizing plate is indispensable in the IPS mode because light and shade display is attained by utilizing the birefringence due to the optical anisotropy of a liquid crystal material. The use of the polarizing plate is a factor of reducing the light transmittance because absorbs a considerable part of incident light.

Various types of liquid crystal electro-optical devices have been proposed which decrease the degree of reduction in light transmittance caused by the polarizing plate. Among those techniques is a guest-host mode which does not require any polarizing plate and which can utilize, without any alteration, the manufacturing techniques of conventional liquid crystal electro-optical devices. In particular, an operation mode invented by White and Taylor, which will be hereinafter called "WT mode," is typical of the guest-host mode.

In general, the guest-host mode is an operation mode which utilizes a dichroic dye added to a liquid crystal material. The term "guest-host mode" derives from the fact that the liquid crystal molecules and the dichroic dye are regarded as a host and a guest, respectively.

In the case of WT mode, a phase transition occurs, in which the cholesteric liquid crystal is transited to the nematic phase. This is caused by voltage non-application/application switching. Therefore, selection between light absorption and transmission is effected.

The guest-host mode that does not require any polarizing plate is disclosed in "Liquid Crystal Display," supervised by T. Ohkoshi, edited by the Institute of Television Engineers of Japan, pp. 84–94, and "Fundamentals of Liquid Crystals and their Application to Displays," M. Yoshino and M. Ozaki, Corona Publishing Co., Ltd., pp. 143–147.

However, in conventional guest-host mode liquid crystal electro-optical devices, the optical axes of liquid crystal molecules are equally arranged in the direction perpendicular to the substrate surface in a light transmission state (FIG. 5). As a result, the above-mentioned viewing angle problem occurs even in the guest-host type liquid crystal electro-optical devices. For example, even in a non-colored state with application of an electric field, the screen is colored at certain viewing angles.

As described above, although the liquid crystal electro-optical device that operates in the IPS mode has the advantage of a wide viewing angle, it is disadvantageous in that the brightness is low due to the use of a polarizing plate.

In contrast, the guest-host mode that does not require any polarizing plate has the advantage that it can output incident light without decreasing its intensity, that is, it can efficiently utilize light. However, like other conventional liquid crystal electro-optical devices, this mode has the problem of a strong dependence on the viewing angle.

SUMMARY OF THE INVENTION

An object of the present invention is to provide, by solving the above problems, a liquid crystal electro-optical device which has both of the advantage of the IPS mode, i.e., the superior viewing angle characteristic and the advantage of the guest-host mode, i.e., the efficient utilization of light.

The present invention is applied to a liquid crystal electro-optical device of a lateral electric field driving type, and is characterized in that light transmission and absorption are performed by a light modulating layer that is constituted of a liquid crystal. In particular, the invention enables display without using any polarizing plate.

More specifically, according to one aspect of the invention, there is provided a liquid crystal electro-optical device comprising a pair of substrates at least one of which is transparent; a light modulating layer interposed between the pair of substrates, the light modulating layer including a liquid crystal, an optically active substance, and a dichroic dye; and means for applying an electric field in a direction parallel with the pair of substrates.

According to another aspect of the invention, there is provided a liquid crystal electro-optical device comprising a pair of substrates at least one of which is transparent; a light modulating layer interposed between the pair of substrates, the light modulating layer including a liquid crystal, an optically active substance, and a dichroic dye; means provided on at least one of the pair of substrates, for orienting the light modulating layer; and means for applying an electric field in a direction parallel with the pair of substrates.

DETAILED DESCRIPTION OF THE PREFERRED EMBODIMENT

Figure 2:
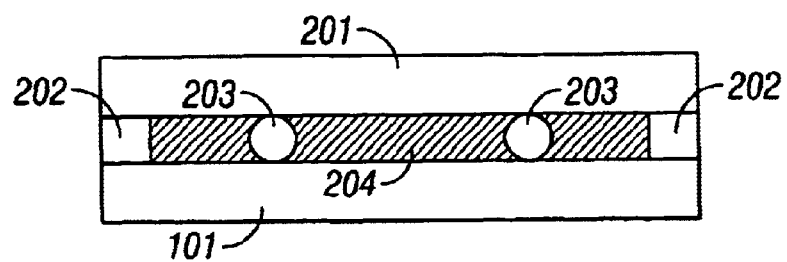
FIG. 2 is schematic sectional view of the liquid crystal electro-optical device of the embodiment.

FIG. 2 show a specific configuration of a liquid crystal electro-optical device according to an example of the present invention.

In FIG. 2, each of a first substrate 101 and a second substrate 201 is transparent and is made of a material having a certain level of strength with respect to external force, examples of which are inorganic materials such as glass and quartz.

A liquid crystal material serving as a light modulating layer 204 is interposed between the substrates 101 and 201. The liquid crystal material is a liquid crystal containing a dichroic dye and an optically active substance therein.

A metal material such as copper, aluminum, tantalum, titanium, or chromium, and a silicide material are used as an electric field applying means. Other examples of the electric field applying means are transparent conductive materials such as ITO (indium tin oxide), tin oxide, and indium oxide.

A sealing member 202 is formed into a desired pattern to serve as an adhesive to bond the substrates 101 and 202 together.

Spacers 203 are used to secure that the interval between the substrates 101 and 201 are uniform over the entire cell.

In the invention, the cell parameters of the liquid crystal electro-optical device are determined as follows to provide superior display performance:

(1) The wavelength λ (generally 380–780 nm) of incident light, the refractive index anisotropy Δλ, and the spiral pitch p have a relationship $n \geq \Delta\lambda \cdot p$.

(2) The spiral pitch p [μm] is in a range of $1 \leq p \leq 15$.

(3) The cell thickness d [μm] is in a range of $1 \leq d \leq 10$.

(4) The orientation twist angle θ of liquid crystal molecules as measured between the bottom and top substrates 101 and 201 is in a range of $\theta \leq 300°$.

(5) The interelectrode distance L is in a range of L<25 μm (the lower limit is about 1 μm).

The driving method may be of an active matrix type, a multiplex type, or the like.

In the case of the multiplex driving method, it suffices that only two types of electrodes, i.e., a display electrode and a reference electrode, be formed on the first substrate 101. On the other hand, in the active matrix driving method, it is necessary to additionally form, for each pixel, a switching element, which is a non-linear element such as a thin-film transistor TFT or diode.

The TFT may be of a type having an a-Si (amorphous silicon) or p-Si (polysilicon) active layer. In the case of the active matrix driving method, the driving element may have the known staggered or inverted staggered structure.

The electrode cross-section may not only assume a rectangle or a trapezoid but also be a gentle or curved cross-section. A gentle electrode cross-section can provide a lateral electric field having a smooth variation in strength.

The opposed substrate 201 may be made of the same kind of material as the substrate 101 on which TFTs are formed. Although there is no particular reason for forming an electrode on the opposed electrode, an electrode may be formed on part or all of its surface when necessary. In this case, the electrode may be made of one of the above-mentioned metal materials or a transparent material such as ITO.

To improve the contrast, it is effective to provide a means (black matrix) for light-shielding portions that do not relate to display on the opposed substrate 201 or the TFT substrate 101, or both. The light-shielding means may be made of a metal such as Cr, a polymeric material in which a black pigment is dispersed, or a like material.

The liquid crystal may be a nematic liquid crystal, for instance. An optically active substance is added to the liquid crystal to have it assume a cholesteric phase. It is desired that the concentration of the dichroic dye be about 1 wt % with respect to a mixture containing the liquid crystal.

In this case, a nematic liquid crystal is utilized. However, using other liquid crystals assuming a cholesteric phase, the same effect can be obtained.

This embodiment employs a combination of a nematic liquid crystal added by an optically active substance and a dichroic dye (positive type).

Either the reflection-type or transmission-type display mode may be employed. In the reflection-type display mode, a reflection plate made of a metal, for instance, is formed on one of the two substrates. The metal reflection plate can also serve as electrodes for pixels, etc.

A description will now be made of the principle of switching of the liquid crystal electro-optical device according to the invention.

Figure 3:
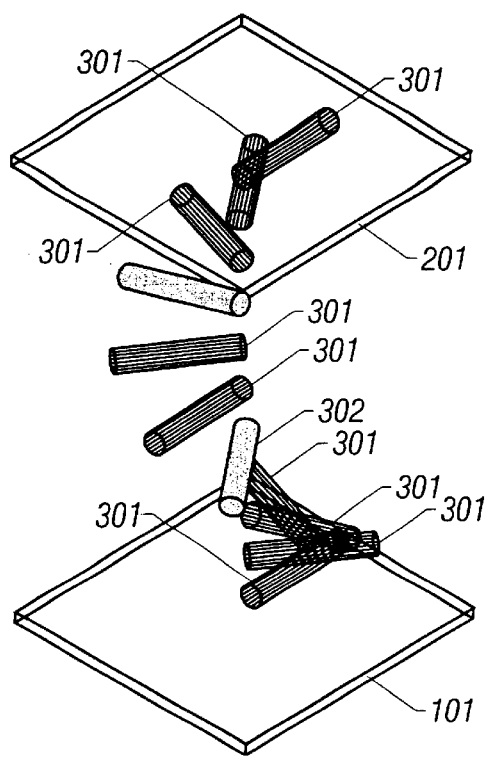
FIG. 3 illustrates a light absorption state of the liquid crystal electro-optical device of the embodiment.

When no electric field is applied, liquid crystal/dichroic dye molecules in he light modulating layer are so oriented as to assume a spiral as shown in FIG. 3. In this state, major axes of dichroic dye molecules contained in the liquid crystal material are parallel with the substrates and are directed to any directions around the axis that is perpendicular to the substrates. Therefore, any polarization components of incident natural light are absorbed, to attain a dark state.

On the other hand, when an electric field is applied, liquid crystal/dichroic dye molecules are oriented parallel with the electric field direction. Since the electric field is applied parallel with the substrates, major axes of liquid crystal molecules and dichroic dye molecules contained in the liquid crystal material are made parallel with not only the substrates but also a given direction.

If a positive dye is used, light traveling along the major axis direction of dichroic dye molecules is absorbed. However, light traveling in a direction that is deviated from the major axis direction is not absorbed much. Therefore, part of the incident light passes through the light modulating layer.

Although some part of the incident light is absorbed by the dichroic dye, the light transmittance is far higher than that of a conventional liquid crystal electro-optical device of IPS-mode driving which uses a polarizing plate. A brighter display is realized in this manner.

As for the driving of the liquid crystal, by virtue of the switching of liquid crystal molecules by an electric field that is parallel with the substrates, the viewing angle dependence, which is strong in conventional liquid crystal displays, can be reduced.

Further, because of the elimination of a polarizing plate forming step, a liquid crystal electro-optical device can be manufactured by a smaller number of steps than a conventional IPS-mode device.

Next, a description will be made of reasons for restricting the ranges of the various parameters. The characteristics of the liquid crystal electro-optical device of the invention depend on the cell parameters including:

(1) cell thickness d;

(2) interelectrode distance L;

(3) refractive index anisotropy $\Delta n$ of a liquid crystal; and (4) spiral pitch p.

To allow the light modulating layer to absorb natural light, the refractive index anisotropy $\Delta n$ and the spiral pitch p are so set as to satisfy $\lambda \geq \Delta n \cdot p$. The pitch p is defined as a distance necessary for liquid crystal molecules to form a spiral of 360°.

The light modulating layer satisfying this condition can efficiently absorb respective polarization components of incident light.

Where the parameters do not satisfy the above relationship, part of the polarization components of light incident on the light modulating layer are not absorbed, which means that a complete dark state is not realized since a light is transmitted even in the dark state. This is a factor of reducing the display contrast.

In the invention, the light absorption by the light modulating layer can be made more efficient by decreasing the spiral pitch p. Thus, the display contrast can further be enhanced.

However, if the spiral pitch p is made too small, the threshold value increases to require a large drive voltage, which means a large power consumption. This impairs the low power consumption characteristic of a liquid crystal display. This problem is common to both of the multiplex and active matrix liquid crystal displays.

In addition, a large drive voltage means a heavier load on thin-film transistors. This reduces the durability of a display.

Another problem caused by the reduction in spiral pitch p is a phenomenon that the steepness of switching around the threshold of a liquid crystal material is lowered. That is, if the spiral pitch p made too small, high-speed switching cannot ba attained. In this case, in switching from a voltage non-application state to a voltage application state, a light absorption state continues for a certain time, that is, a transition to a light transmission state is not effected quickly.

Conversely, in switching from a voltage application state to a voltage non-application state, a transition to a light absorption state is not effected quickly, that is, the light modulating later transmits light for a certain time. As such, it becomes difficult to realize a display device capable of high-speed display.

As described above, a tradeoff relationship exists between the contrast and the threshold characteristic, and depends on the spiral pitch.

In the invention, the spiral pitch p [$\mu m$] is set in a range of $1 \leq p \leq 15$. In this range, both of the contrast and the threshold characteristic are improved to secure good display state of a display device.

The display characteristics also depend on the cell thickness d as well as the viscosity of an added optically active substance and the spiral pitch p of a liquid crystal.

To reduce the influences of the above factors, a dichroic dye, whose viscosity increasing effect when added to a liquid crystal layer is considered small, is used.

Results of a study on the influences of the cell thickness d with the use of azo dyes as the dichroic dye will be described below. It is assumed that the spiral pitch p of a liquid crystal is set constant by properly adjusting the amount of an added optically active substance.

The threshold characteristic, the contrast, the rise time, and the uniformity of switching in the cell thickness direction depend on the cell thickness of the entire light modulating layer having a given spiral pitch p.

As the cell thickness d decreases, the threshold value increases, that is, the drive voltage increases. As a result, it becomes difficult to drive TFTs with a small power consumption, and a voltage higher than the voltage setting range of conventional drive circuits is required. This requires a new circuit design.

However, if the cell thickness is increased, the electric field intensity becomes non-uniform. Further, there occurs a variation in the rise time of a liquid crystal etc. (i.e., the time necessary for a liquid crystal etc. to be varied so as to be not only parallel with the substrates but also in a determined direction) at the time of voltage application. This causes fluctuations in displayed colors at the time of a hue transition by a dichroic dye.

Further, the contrast is lowered as the cell thickness d increases. Therefore, to improve the contrast, the cell thickness d is desired to be decreased.

In the invention, in particular, the cell thickness d [$\mu m$] is set in a range of $1 \leq d \leq 10$. In this range, relatively good display performance is obtained in terms of the threshold value, contrast, rise time, uniformity of display in the cell thickness direction.

It has been confirmed that the contrast is improved by increasing the orientation twist angle $\lambda$ of liquid crystal molecules.

On the other hand, if the twist angle n is too large, the rise characteristic in applying an electric field and that in removing an electric field do not coincide with each other, which is undesirable for a display device.

To obtain satisfactory contrast and threshold characteristics, it is preferable that the twist angle $\theta$ be in a range of $\theta \leq 300°$.

The reasons why the interelectrode distance L is set shorter than 25 μm will be described below.

First, a description will be made of how dichroic dye molecules are oriented by an electric field. Dichroic dye molecules are oriented in the same direction as the light modulating layer. When a lateral electric field is applied, switching so made that major axes of the light modulating layer become not only parallel with the substrates but also in a determined direction. Dichroic dye molecules are re-oriented accordingly, that is, they are re-oriented so that their major axes become not only parallel with the substrates but also in a determined direction.

In the invention, a positive dichroic dye is switched by a lateral electric field. Therefore, even during application of an electric field, a certain level of light absorption occurs due to light absorption in the major-axis direction of dichroic dye molecules.

There occurs no light absorption by a positive dichroic dye during driving by a longitudinal electric field because of vertical orientation of dichroic dye molecules. That is, in theory, it is unavoidable that the contrast of the driving method using a lateral electric field is lower than that of the driving method using a longitudinal electric field.

Thus, the profile of a lateral electric field formed determines the degree of light transmission of the light modulating layer. As described above, major axes of dichroic dye molecules are parallel with the substrates. However, since an electric field in the vicinity of an electrode is perpendicular to the substrates, dichroic molecules in the vicinity of the electrode are so oriented that their major axes are perpendicular to the substrates.

A positive dichroic dye has a large absorption coefficient in its major-axis direction while exhibiting almost no light absorption in its minor-axis direction. Therefore, vertically oriented dichroic dye molecules in the vicinity of an electrode hardly absorb light.

It is therefore concluded that the light absorption as a whole due to a dichroic dye is smaller as the interelectrode distance L is shorter. This is because an electric field rises more steeply from an electrode when the interelectrode distance L is shorter.

In the invention, a light transmission state is established when a lateral electric field is applied. Therefore, the contrast as a whole can be improved by increasing the transmission light quantity at the time of electric field application. That is, a shorter interelectrode distance L is desired in terms of contrast.

The interelectrode distance L also influences the threshold characteristic. As the interelectrode distance L becomes longer, both of the threshold value and the drive voltage are increased, which makes it difficult to realize low-voltage driving.

An experiment in which the interelectrode distance L was varied revealed that relatively good contrast can be obtained when L<20 μm.

FIG. 3 schematically shows a dark state in which the light modulating layer does not transmit incident light. As seen from FIG. 3, a spiral orientation state is established in the light modulating layer such that the orientation vector of liquid crystal molecules 301 gradually changes its angle around the minor-axis direction of liquid crystal molecules 301 as the layer of liquid crystal molecules 301 is changed.

FIG. 3 shows an orientation state in which major axes of liquid crystal molecules 301 and dichroic dye molecules 302 are rotated from the substrate 101 to the substrate 201 by 180° around the axis that is perpendicular to the substrates.

When an electric field that is parallel with the substrates is not applied, dichroic dye molecules that are added to the liquid crystal are oriented in all directions around the axis that is perpendicular to the substrates, as shown in FIG. 3.

Therefore, when part of natural light having any polarization direction enters the light modulating layer, there exist major axe components of dichroic dye molecules. In this case, most of the incident light is absorbed by such dye molecules, whereby black display is obtained. That is, there is obtained a state that the llight modulating layer does not transmit incident light.

Figure 4:
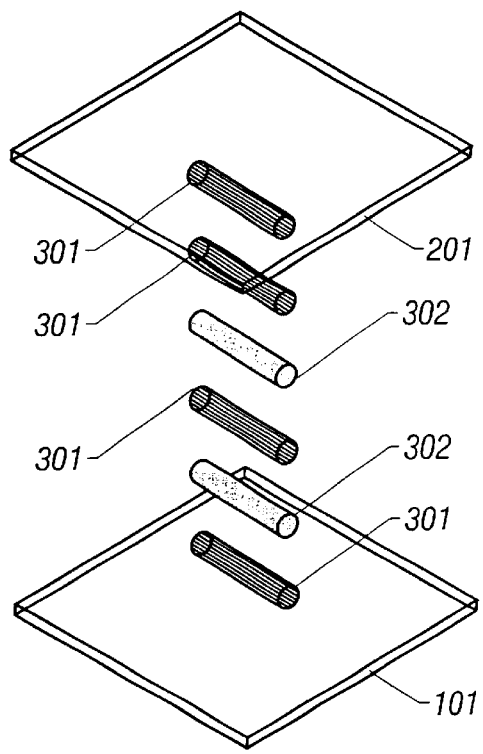
FIG. 4 illustrates a light transmission state of the liquid crystal electro-optical device of the embodiment.
Figure 5:
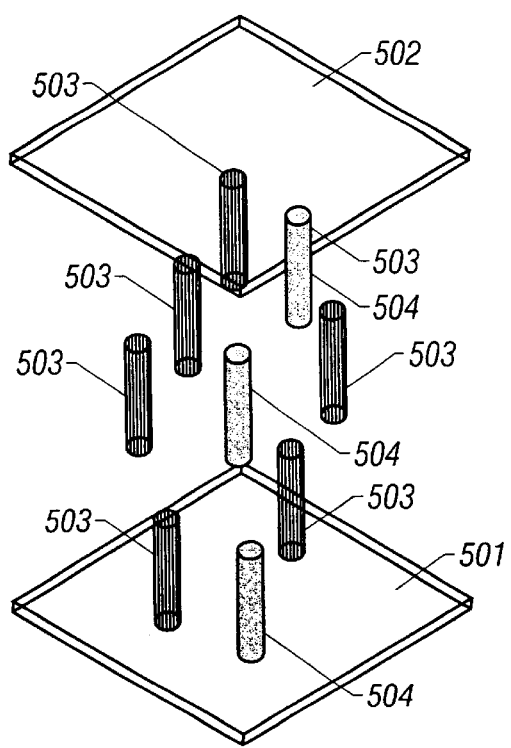
FIG. 5 illustrates a light transmission state of a conventional liquid crystal electro-optical device.

On the other hand, when an electric field is applied, as shown in FIG. 4, molecules constituting the light modulating layer 204 are so oriented that their major axes extend along the electric field direction that is parallel with the substrates.

Therefore, although part of incident natural light whose polarization component is parallel with the major-axis direction of molecules is absorbed, the other part of the incident light is hardly absorbed and passes through the light modulating layer. Thus, a transmission state, i.e., a light state is obtained for a viewer.

Both black and transparent states can be displayed by switching between the above electric field non-application and application states.

Figure 1A:
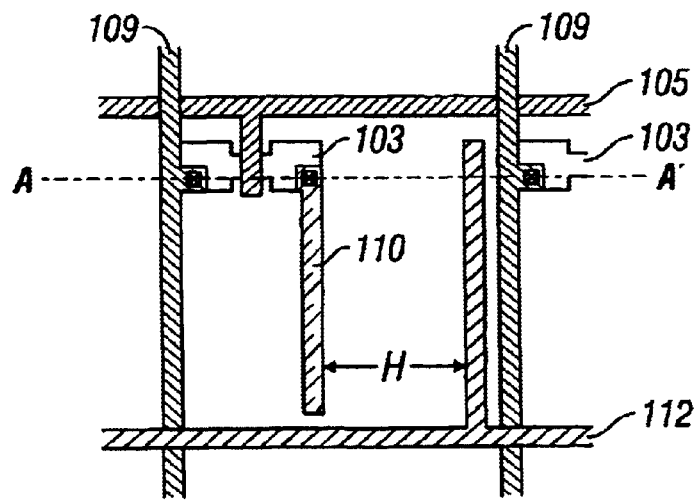
FIGS. 1A and 1B schematically show a TFT substrate of a liquid crystal electro-optical device according to an embodiment of the present invention.
Figure 1B:
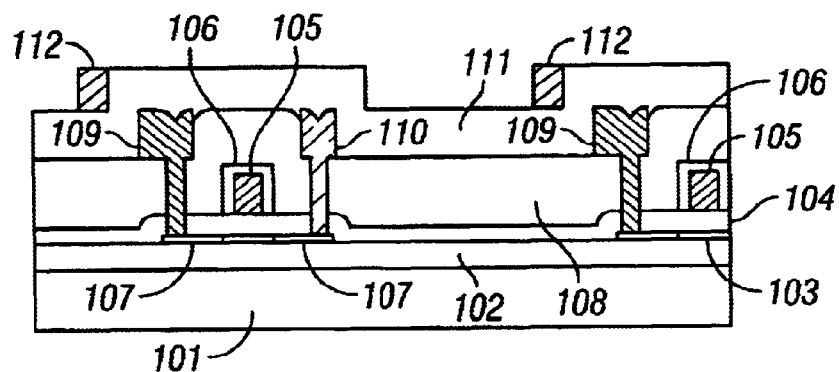

A manufacturing process of the liquid crystal electro-optical device of FIG. 2 will be hereinafter described. FIG. 2 is a schematic sectional view of the liquid crystal electro-optical device of the embodiment. This liquid crystal electro-optical device uses, as one of the two substrates, a substrate on which TFTs, wiring lines, and other parts are formed as shown in FIGS. 1A and 1B. FIG. 1A is a schematic top view of a pixel section, and FIG. 1B is a schematic sectional view taken along line A–A' in FIG. 1A.

First, a 2,000-Å-thick silicon oxide film as an undercoat film 102 is formed on a glass substrate 101 by plasma CVD or thermal CVD.

It is desirable that a non-alkaline glass such as Corning #1737 or a quartz glass be used as the substrate (hereinafter called "TFT substrate") 101. When it is intended to reduce the weight of the liquid crystal electro-optical device, a film with a low degree of birefringence, such as PES (polyethylene sulphate), may be used.

Next, an amorphous silicon film is formed by plasma CVD at a thickness of 300–2,000 Å, for instance, 500 Å.

To effect crystallization, thermal annealing is then performed at less then 600°, preferably less than 550°. To enhance the crystallinity, further annealing may be performed by using laser light or equivalent strong light.

In particular, the crystallization is accelerated by adding a catalyst element for accelerating crystallization such as nickel to the amorphous silicon film in the thermal crystallization step. This enables formation of a polysilicon film that is high in crystallinity on an inexpensive glass substrate. Details are described in Japanese Unexamined Patent Publication No. Hei. 6-244103.

A resulting silicon film is etched into an island-like silicon film 103. Thereafter, a silicon oxide film as a gate insulating film 104 is formed by plasma CVD using TEOS at a thickness of 500–1,200 Å, for instance, 1,000 Å.

Subsequently, an aluminum film is formed by sputtering at a thickness of 2,000–6,000 Å, and then patterned into a gate line 105 of 8 μm in width.

A 700-Å-thick dense anodic oxide film 106 is formed on the surface of the gate line 105 by anodization in which a weak acid solution is used as a formation liquid. The anodic oxide film 106 has a function of protecting a gate electrode mechanically and electrically.

Next, conductive regions 107 are formed by implanting impurity ions into the island-like silicon film 103 in a self-aligned manner by using the gate line 105 as a mask and thereby imparting n-type or p-type conductivity to the ion-implanted regions. One of the conductive regions 107 becomes a source region and the other becomes a drain region.

It is effective to employ what is called a monolithic structure in which peripheral driver circuits (not shown) constituted of polysilicon TFTs are formed outside and adjacent to the active matrix region. In this case, both p-channel and n-channel TFTs are formed (complementary configuration).

A silicon nitride film as a first interlayer insulating film 108 is formed on the above structure by plasma CVD at a thickness of 3,000–6,000 Å, for instance, 4,000 Å. Instead of the silicon nitride film, a silicon oxide film or a multilayer film of a silicon oxide film and a silicon nitride film may be formed.

Thereafter, contact holes are formed by etching the first interlayer insulating film 108 at positions corresponding to the source and drain regions. An aluminum film or a multilayer film of titanium and aluminum is formed by sputtering or the like at a thickness of 2,000–6,000 Å, for instance, 3,000 Å, and then patterned into a source line 109 (width: 6 μm) and a drain electrode 110 (width: 8 μm).

A transparent organic (polyimide or acrylic) resin film as a second interlayer insulating film 111 is formed on the above structure at a thickness of 4,000–10,000Å, for instance, 5,000 Å. It is apparent that an inorganic material such as silicon oxide, silicon nitride, or silicon oxynitride can be used to form the interlayer insulating film 111. However, the use of an organic material (polyimide or acrylic) has an advantage that asperities of electrodes, elements, etc. can be planarized.

Subsequently, a conductive coating of aluminum, copper, chromium, titanium, ITO, or the like is formed by a known method such as sputtering, and then patterned into a common line 112 of 8 μm in width. The interval H between the drain electrode 110 and the common line 112 is set at 12 μm. As shown in FIG. 1A, the drain electrode 110 and the common line 112 are formed parallel with each other.

Although each electrode has a rectangular cross-section as shown in FIG. 1B, it may have a trapezoidal cross-section with a slope or have a curved cross-section. In the latter case, isotropic plasma etching or wet etching is performed after formation of a photoresist.

A silicon oxide film (not shown) as a protection film may be formed at a thickness of 5,000–10,000 Å, for instance, 5,000 Å.

Next, as shown in FIG. 2, after a sealing member 202 made of an epoxy resin is formed on a peripheral portion of the substrate 201, the substrates 101 and 201 are bonded together, to form a cell.

In this embodiment, spherical spacers 203 of 4 μm in diameter are interposed between the two substrates 101 and 201 to make the substrate interval uniform over the entire panel surface. The TFTs, the wiring lines, and other parts that are shown in FIGS. 1A and 1B are not shown in FIG. 2.

The sealing member 202 need not always be made of an epoxy resin, and there is no problem even if some other resin such as an urethane acrylate type resin is used. Further, the spherical spacers 203 may be made of either an organic or inorganic material.

In this embodiment, the cell thickness is set at 4 μm.

Subsequently, a liquid crystal etc. are injected between the two substrates 101 and 201 by vacuum injection or a like method to form a light modulating layer 204. The material of the light modulating layer 204 is a mixture of a liquid crystal material, a dichroic dye, and an optically active substance.

In this embodiment, the liquid crystal material is ZLI-3200 (produced by Merck) in which an azo dye is added to a nematic liquid crystal material and which exhibits dielectric constant anisotropy of −4.8 and refractive index anisotropy of +0.0437. The azo dye is added at 3.46%.

The nematic liquid crystal material is not limited to the above one, but may be any material that exhibits nematic characteristics at the room temperature.

It is desirable that the dichroic dye be highly soluble in a liquid crystal and photochemically stable. Specifically, it may be an azo dye, an anthraquinone dye, a naphthaquinone dye, a perylene dye, a quinophthalone dye, a tetrazine dye, a coumarin dye, or the like.

The addition of a dichroic dye changes the viscosity of the liquid crystal (the light modulating layer 204). The viscosity variation depends on the kind of added dichroic dye: azo dyes exhibit a smaller viscosity increasing effect than anthraquinone dyes and other kinds of dyes.

Further, S-811 (produced by Merck) as the optically active substance is added to the liquid crystal material, whereupon the liquid crystal material assumes a cholesteric phase at the room temperature.

FIG. 3 schematically shows a dark state in which the light modulating layer 204 does not transmit incident light. As seen from FIG. 3, a spiral orientation state is established in the light modulating layer 204 such that the orientation vector of liquid crystal molecules 301 gradually changes its angle around the minor-axis direction of liquid crystal molecules 301 as the layer of liquid crystal molecules 301 is changed.

In FIG. 3, liquid crystal molecules 301 and dichroic dye molecules 302 are shown schematically and are not drawn on the same scale as the substrates 101 and 201. The TFTs, the wiring lines, and other parts (see FIGS. 1A and 1B) and the spacers and the sealing member (see FIG. 2) are not shown in FIG. 3. Actually, liquid crystal molecules 301 and dichroic dye molecules 302 exist infinitely between the substrates 101 and 201. Further, the optically active substance (not shown) is not limited to the above-mentioned material, and may be any material as long as it is soluble in the liquid crystal material.

In this embodiment, the addition amount of the optically active substance is so adjusted that the spiral pitch p becomes 8 μm. With such an adjustment, an orientation state is established in which major axes of liquid crystal molecules 301 and dichroic dye molecules 302 rotate from the substrate 101 to the substrate 201 by 180° around the axis that is perpendicular to the substrates.

In the liquid crystal electro-optical device of this embodiment, when no electric field is applied between the drain electrode 110 and the common electrode 112, whose interval is denoted by L, dichroic dye molecules 302 that are contained in the liquid crystal material are oriented in all directions around the axis that is perpendicular to the substrates 101 and 201.

In this state, when part of natural light having any polarization direction enters the light modulating layer, there exist major axe components of dichroic dye molecules 302. Therefore, the incident light is absorbed by such dye molecules 302, whereby black display is obtained. That is, there is obtained a state that the light modulating layer 204 does not transmit incident light.

On the other hand, when an electric field is applied, as shown in FIG. 4, molecules constituting the light modulating layer 204 are so oriented that their major axes extend along the electric field direction that is parallel with the substrates 101 and 201.

Therefore, although part of incident natural light whose polarization component is parallel with the major-axis direction of molecules is absorbed, the other part of the incident light is not absorbed and passes through the light modulating layer 204. Thus, a transmission state, i.e., a light state is obtained for a viewer.

Both black and transparent states can be displayed by switching between the above electric field non-application and application states.

In this embodiment, an orientation film may be provided on at least one of the substrates 101 and 201 to exert orientation restricting force on the liquid crystal etc. Due to its orientation restricting force, the orientation film realizes uniform orientation of the liquid crystal, whereby a display device with little unevenness in color can be obtained. In addition, the occurrence of orientation defects such as disclinations can be reduced.

As described above, the invention can provide a superior liquid crystal electro-optical device which is bright and has a low degree of viewing angle dependence.

What is claimed is:

1. A liquid crystal display device comprising:

a first substrate;

a second substrate opposing to the first substrate;

a light modulating layer being interposed between the first substrate and the second substrate;

at least a pixel being formed over the first substrate, said pixel comprising:
a thin film transistor including a source region, a drain region, a channel region being interposed between the source and drain regions, a gate electrode being adjacent to the channel region with a gate insulating film interposed therebetween;
a drain electrode being connected to the drain region;
a gate line being connected to the gate electrode;
a common electrode being formed in parallel with the drain electrode;
a common line being connected to the common electrode, wherein an electric field is formed between the drain electrode and the common electrode in a parallel direction to the first substrate, wherein said light modulating layer is operated in a guest-host mode, wherein said liquid crystal display device includes no polarizing plate, wherein said light modulating layer comprises a liquid crystal material, an optically active substance and a dichroic dye, wherein said liquid crystal material has a spiral pitch p in a range of $1 \leq p \leq 15$ μm, and wherein a cell thickness d is in a range of $1 \leq d \leq 10$ μm.

2. A device according to claim 1, wherein the source region, the drain region and the channel region are formed in a crystalline semiconductor island.

3. A device according to claim 1, wherein said thin film transistor is one selected from the group consisting of a stagger type and an inverted stagger type.

4. A device according to claim 1, wherein said liquid crystal material shows a cholesteric phase with no application of voltage.

5. A liquid crystal display device comprising:

a first substrate;

a second substrate opposing to the first substrate;

a light modulating layer being interposed between the first substrate and the second substrate, said light modulating layer including at least a liquid crystal material;

at least a pixel being formed over the first substrate, said pixel comprising:
a thin film transistor including a source region, a drain region, a channel region being interposed between the source and drain regions, a gate electrode being adjacent to the channel region with a gate insulating film interposed therebetween;
a drain electrode being connected to the drain region;
a gate line being connected to the gate electrode;
a common electrode being formed in parallel with the drain electrode;
a common line being connected to the common electrode, wherein an electric field is formed between the drain electrode and the common electrode in a parallel direction to the first substrate, wherein said light modulating layer is operated in a guest-host mode, wherein said liquid crystal display device includes no polarizing plate, wherein said liquid crystal material has a spiral pitch p in a range of $1 \leq p \leq 15$ μm, wherein a cell thickness d is in a range of $1 \leq d \leq 10$ μm, wherein molecules of said liquid crystal material have an orientation twist angle θ in a range of $\theta \leq 300°$, wherein an interelectrode distance L being defined between said drain electrode and said common electrode is in a range of $L \leq 25$ μm.

6. A device according to claim 5, wherein said light modulating layer further includes an optically active substance and a dichroic dye.

7. A device according to claim 5, wherein the source region, the drain region and the channel region are formed in a crystalline semiconductor island.

8. A device according to claim 5, wherein said thin film transistor is one selected from the group consisting of a stagger type and an inverted stagger type.

9. A device according to claim 5, wherein said liquid crystal material shows a cholesteric phase with no application of voltage.

10. A reflective type liquid crystal display device comprising:

a first substrate;

a second substrate opposing to the first substrate;

a reflection plate formed over one of said substrates;

a light modulating layer being interposed between the first substrate and the second substrate;

at least a pixel being formed over the first substrate, said pixel comprising:
a thin film transistor including a source region, a drain region, a channel region being interposed between the source and drain regions, a gate electrode being adjacent to the channel region with a gate insulating film interposed therebetween;
a drain electrode being connected to the drain region;
a gate line being connected to the gate electrode;
a common electrode being formed in parallel with the drain electrode;

a common line being connected to the common electrode, wherein an electric field is formed between the drain electrode and the common electrode in a parallel direction to the first substrate, wherein said light modulating layer is operated in a guest-host mode, wherein said liquid crystal display device includes no polarizing plate, wherein said light modulating layer comprises a liquid crystal material, an optically active substance and a dichroic dye, wherein said liquid crystal material has a spiral pitch p in a range of $1 \leq p \leq 15$ μm, and wherein a cell thickness d is in a range of $1 \leq d \leq 10$ μm.

11. A device according to claim 10, wherein the source region, the drain region and the channel region are formed in a crystalline semiconductor island.

12. A device according to claim 10, wherein said thin film transistor is one selected from the group consisting of a stagger type and an inverted stagger type.

13. A device according to claim 10, wherein said liquid crystal material shows a cholesteric phase with no application of voltage.

14. A liquid crystal display device comprising:

a first substrate;

a second substrate opposing to the first substrate;

a light modulating layer being interposed between the first substrate and the second substrate;

at least a pixel being formed over the first substrate, said pixel comprising:
a thin film transistor including a source region, a drain region, a channel region being interposed between the source and drain regions, a gate electrode being adjacent to the channel region with a gate insulating film interposed therebetween;
a drain electrode being connected to the drain region;
a gate line being connected to the gate electrode;
a common electrode being formed in parallel with the drain electrode;
a common line being connected to the common electrode, wherein an electric field is formed between the drain electrode and the common electrode in a parallel direction to the first substrate, wherein said light modulating layer is operated in a guest-host mode, wherein said liquid crystal display device includes no polarizing plate, wherein a light shielding means is formed over at least one of the first and second substrates to shield at least said channel region, and wherein said light modulating layer comprises a liquid crystal material, an optically active substance and a dichroic dye, wherein said liquid crystal material has a spiral pitch p in a range of $1 \leq p \leq 15$ μm, and wherein a cell thickness d is in a range of $1 \leq d \leq 10$ μm.

15. A device according to claim 14, wherein the source region, the drain region and the channel region are formed in a crystalline semiconductor island.

16. A device according to claim 14, wherein said thin film transistor is one selected from the group consisting of a stagger type and an inverted stagger type.

17. A device according to claim 14, wherein said light shielding means comprises one selected from a metal and a polymeric material with a black pigment therein.

18. A device according to claim 14, wherein said liquid crystal material shows a cholesteric phase with no application of voltage.

19. A liquid crystal display device comprising:

a first substrate;

a second substrate opposing to the first substrate;

a light modulating layer being interposed between the first substrate and the second substrate;

at least a pixel being formed over the first substrate, said pixel comprising:
a thin film transistor including a source region, a drain region, a channel region being interposed between the source and drain regions, a gate electrode being adjacent to the channel region with a gate insulating film interposed therebetween;
a drain electrode being connected to the drain region;
a gate line being connected to the gate electrode;
a common electrode being formed in parallel with the drain electrode;
a common line being connected to the common electrode, wherein an electric field is formed between the drain electrode and the common electrode in a parallel direction to the first substrate, wherein said light modulating layer has first and second states, said first state being capable of transmitting a light while said second state being capable of absorbing the light, wherein said light modulating layer comprises a liquid crystal material, an optically active substance and a dichroic dye, and wherein said liquid crystal material has a spiral pitch p in a range of $1 \leq p \leq 15$ μm.

20. A device according to claim 19, wherein the source region, the drain region and the channel region are formed in a crystalline semiconductor island.

21. A device according to claim 19, wherein said thin film transistor is one selected from the group consisting of a stagger type and an inverted stagger type.

22. A device according to claim 19, wherein said liquid crystal material shows a cholesteric phase with no application of voltage.

23. A liquid crystal display device comprising:

a first substrate;

a second substrate opposing to the first substrate;

a light modulating layer being interposed between the first substrate and the second substrate;

at least a thin film transistor including a source region, a drain region, a channel region being interposed between the source and drain regions, a gate electrode being adjacent to the channel region with a gate insulating film interposed therebetween;

a drain electrode being connected to the drain region;

a gate line being connected to the gate electrode;

an insulating film comprising an organic resin and being formed over the thin film transistor and the drain electrode;

a common electrode being formed in parallel with the drain electrode and being formed over the insulating film;

a common line being connected to the common electrode, wherein an electric field is formed between the drain electrode and the common electrode in a parallel direction to the first substrate, wherein said light modulating layer comprises a liquid crystal material, an optically active substance and a dichroic dye, and wherein said liquid crystal material has a spiral pitch p in a range of $1 \leq p \leq 15$ μm.

24. A device according to claim 23, wherein the source region, the drain region and the channel region are formed in a crystalline semiconductor island.

25. A device according to claim 23, wherein the thin film transistor is one selected from the group consisting of a stagger type and an inverted stagger type.

26. A device according to claim 23, wherein said liquid crystal material shows a cholesteric phase with no application of voltage.

27. A liquid crystal display device comprising:

a first substrate;

a second substrate opposing to the first substrate;

a light modulating layer being interposed between the first substrate and the second substrate;

at least a thin film transistor including a source region, a drain region, a channel region being interposed between the source and drain regions, a gate electrode being adjacent to the channel region with a gate insulating film interposed therebetween;

a gate line being connected to the gate electrode;

a first interlayer insulating film being formed over at least the gate electrode;

a drain electrode being connected to the drain region and being formed over the first interlayer insulating film;

a second interlayer insulating film comprising an organic resin and being formed over the first interlayer insulating film and the drain electrode;

a common electrode being formed In parallel with the drain electrode and being formed over the second interlayer insulating film;

a common line being connected to the common electrode, wherein an electric field is formed between the drain electrode and the common electrode in a parallel direction to the first substrate, wherein said light modulating layer comprises a liquid crystal material, an optically active substance and a dichroic dye, and wherein said liquid crystal material has a spiral pitch p in a range of $1 \leq p \leq 15$ μm.

28. A device according to claim 27, wherein the source region, the drain region and the channel region are formed in a crystalline semiconductor island.

29. A device according to claim 27, wherein the thin film transistor is one selected from the group consisting of a stagger type and an inverted stagger type.

30. A device according to claim 27, wherein said liquid crystal material shows a cholesteric phase with no application of voltage.

* * * * *